(12) United States Patent  (10) Patent No.: US 9,021,478 B1
Wan et al.  (45) Date of Patent: Apr. 28, 2015

(54) PROVISIONING VIRTUAL MACHINES FROM TEMPLATE BY SPLITTING AND BUILDING INDEX FOR LOCATING CONTENT PORTIONS VIA CONTENT-CENTRIC NETWORK

(71) Applicant: EMC Corporation, Hopkinton, MA (US)

(72) Inventors: Lintao Wan, Shanghai (CN); YinKee Yee, Newark, CA (US); Ziye Yang, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 267 days.

(21) Appl. No.: 13/628,479

(22) Filed: Sep. 27, 2012

(51) Int. Cl.
G06F 9/455 (2006.01)
G06F 9/50 (2006.01)

(52) U.S. Cl.
CPC ................................. G06F 9/455 (2013.01)

(58) Field of Classification Search
None
See application file for complete search history.

(56) References Cited

U.S. PATENT DOCUMENTS 7,849,462 B2 * 12/2010 Traut et al. .................. 718/1
8,332,689 B2 * 12/2012 Timashev et al. ............ 714/15
2010/0138827 A1 * 6/2010 Frank et al. .................. 718/1
2011/0145534 A1 * 6/2011 Factor et al. ................ 711/170
2012/0167087 A1 * 6/2012 Lee et al. ..................... 718/1
2014/0013322 A1 * 1/2014 Freimuth et al. ............. 718/1

OTHER PUBLICATIONS

C. Peng et al., "VDN: Virtual Machine Image Distribution Network for Cloud Data Centers," Infocom, Mar. 2012, 9 pages.
"CCNx Protocol," ccnx.org/releases/latest/doc/technical/CCNxProtocol.html, Aug. 2012, 7 pages.
"CCNx Repository Protocols," ccnx.org/releases/latest/doc/technical/RepoProtocol.html, Jun. 2012, 7 pages.
"CCNx Interest Message," ccnx.org/releases/latest/doc/technical/InterestMessage.html, Aug. 2012, 6 pages.
"CCNx Signature Generation and Verification," ccnx.org/releases/latest/doc/technical/SignatureGeneration.html, Jun. 2012, 6 pages.
"Content-Centric Networking," en.wikipedia.org/w/index.php?title=Content-centric_networking&printable=yes, Aug. 2012, 4 pages.
"CCNx," ccnx.org/, Sep. 21, 2012, 3 pages.

* cited by examiner

Primary Examiner — Meng An
Assistant Examiner — Michael Ayers
(74) Attorney, Agent, or Firm — Ryan, Mason & Lewis, LLP (57) ABSTRACT

Techniques are disclosed for provisioning virtual machines via content-centric networking approach in a computing system implemented with a distributed virtual infrastructure. In one example, a method comprises the following steps. A virtual machine template is obtained. The virtual machine template defines one or more segments which represent one or more content portions. The one or more content portions are addressable in accordance with a content-centric network communications protocol. At least one virtual machine is deployed from the virtual machine template. The generating and deploying steps are performed on one or more physical processing elements associated with a computing system implemented via a distributed virtual infrastructure.

19 Claims, 7 Drawing Sheets

```
<vdisk>
    <size>10737418240</size>
    <version>2.0</version>
    <author>lintao.wan@emc.com</author>
    <segments>
        <segment offset=0 size=4194304 uri="ccnx://mycorp.com/app1/linuxvm/00" />
        <segment offset=4194304 size=4194304 uri="ccnx://mycorp.com/app1/linuxvm/01" />
        .....
    </segments>
</vdisk>
```

PROVISIONING VIRTUAL MACHINES FROM TEMPLATE BY SPLITTING AND BUILDING INDEX FOR LOCATING CONTENT PORTIONS VIA CONTENT-CENTRIC NETWORK

FIELD

The field relates to computing systems implemented with a distributed virtual infrastructure, and more particularly to techniques for provisioning virtual machines via a content-centric network.

BACKGROUND

Currently, data storage solutions implemented via data centers, such as those using direct attached storage (DAS) or networked storage (i.e., central storage or distributed storage), are known to have limitations or challenges. For example, these challenges may range from scalability, reliability, performance and deduplication to management, cost and other issues. When data storage solutions are implemented in a distributed virtual infrastructure, there are additional challenges.

As is known, main elements of a virtual distributed infrastructure, also known as a cloud infrastructure, include components known as "virtual machines" and "hypervisors." Virtual machines are logical processing elements that may be instantiated on one or more physical processing elements (e.g., servers, computers, processing devices). That is, a virtual machine may be considered a software implementation of a physical machine (i.e., a computer) that is able to execute programs in a manner functionally similar to program execution on a physical machine. Thus, different virtual machines can run different operating systems and multiple applications on the same physical computer. Virtualization is realized via the use of a hypervisor, which is a software component directly inserted on top of the computer hardware and used to allocate hardware resources of the physical computer in a dynamic and transparent manner. It is the hypervisor that enables multiple operating systems to run concurrently on a single physical computer and share hardware resources with each other.

Accordingly, in a data center implemented in a distributed virtual infrastructure that provides processing and/or storage solutions for clients, hundreds of thousands of virtual machines may need to be provisioned simultaneously or at least within a very short time frame. While this is a common challenge for the data center, it is understood to be a nontrivial task. Thus, there is a need to provide improved techniques for the task of provisioning virtual machines, particularly in a data storage environment.

SUMMARY

Embodiments of the invention provide techniques for provisioning virtual machines via content-centric networking approach in a computing system implemented with a distributed virtual infrastructure.

In one embodiment, a method comprises the following steps. A virtual machine template is obtained. The virtual machine template defines one or more segments which represent one or more content portions. The one or more content portions are addressable in accordance with a content-centric network communications protocol. At least one virtual machine is deployed from the virtual machine template. The generating and deploying steps are performed on one or more physical processing elements associated with a computing system implemented via a distributed virtual infrastructure.

Deployment of the at least one virtual machine may comprise specifying a correspondence between sectors of a virtual disk associated with the at least one virtual machine and uniform resource identifiers used to address the one or more content portions associated with the virtual machine template.

The virtual machine template may be stored on a repository and the at least one virtual machine may be deployed on a node, whereby the repository and the node communicate via the content-centric communications protocol.

In another embodiment, a computer program product is provided which comprises a processor-readable storage medium having encoded therein executable code of one or more software programs. The one or more software programs when executed by the one or more physical processing elements of the computer system implement steps of the above-described method.

In yet another embodiment, a content-centric network comprises a repository and one or more nodes operatively coupled to the repository. The repository stores one or more virtual machine templates. Each virtual machine template defines one or more segments which represent one or more content portions associated with the virtual machine template. Each node is configured to deploy one or more virtual machines from at least one of the one or more virtual templates stored at the repository. The one or more nodes communicate with the repository in accordance with a content-centric network communications protocol. The repository and the one or more nodes are implemented on one or more processing devices.

Advantageously, embodiments described herein provide techniques for improved provisioning of virtual machines in a data center environment. The content-centric network approach allows for deduplication of portions of similar VM images. Further, by utilizing an approach whereby a data address is based on content rather than location, management of data in a virtualized data center is vastly improved.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, a "data center" refers to a computing system or environment with one or more processing elements that stores and/or processes data for one or more tenants (e.g., clients or customers) of a provider entity that manages the computer system or environment.

Further, as used herein, the term "provisioning" refers to the process(es) of generating and deploying a computing resource in a computing system, such as for example, in a cloud infrastructure environment, generating and deploying one or more virtual machines in a data center.

Figure 1A:
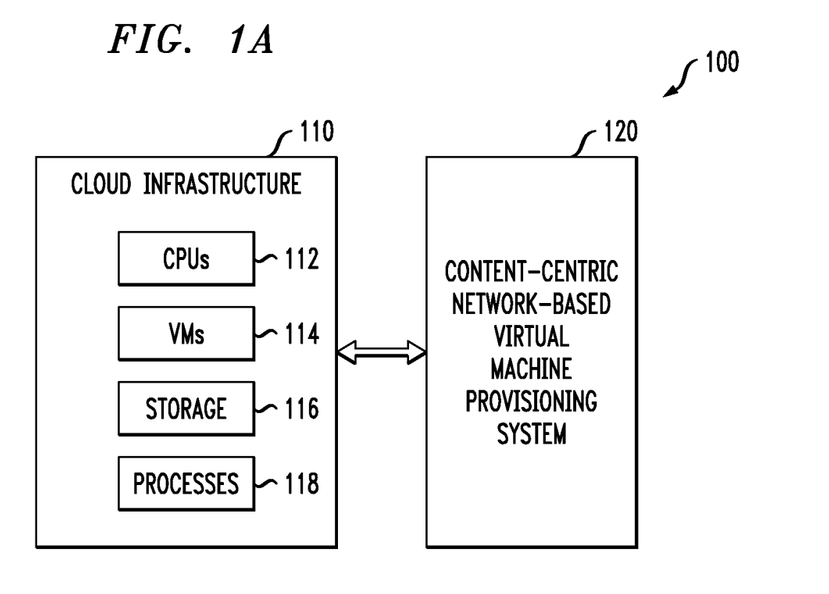
FIG. 1A illustrates cloud infrastructure and a content-centric networking-based virtual machine provisioning system, in accordance with one embodiment of the invention.

FIG. 1A shows a system 100 configured in accordance with an illustrative embodiment of the present invention. The system 100 comprises cloud infrastructure 110 and a content-centric networking-based virtual machine provisioning system 120. As will be explained in detail below, the content-centric networking-based virtual machine provisioning system 120 enables virtual machine (VM) hypervisors to support virtual image provisioning via a content-centric networking approach. Cloud infrastructure 110 is illustratively depicted in the figure as comprising an execution environment with execution components comprising one or more central processing units (CPUs) 112, one or more VMs 114, and storage devices 116 (upon which logical units (LUs) are implemented) that execute one or more processes 118 that operate on one or more process input data sets that generate one or more process output data sets. In one embodiment, cloud infrastructure 110 implements a data storage system associated with a data center.

Although system elements 110 and 120 are shown as separate elements in FIG. 1A, these elements or portions thereof may be implemented at least in part on a common processing platform. For example, system 120 may be implemented within the cloud infrastructure 110. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the content-centric networking-based virtual machine provisioning system 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
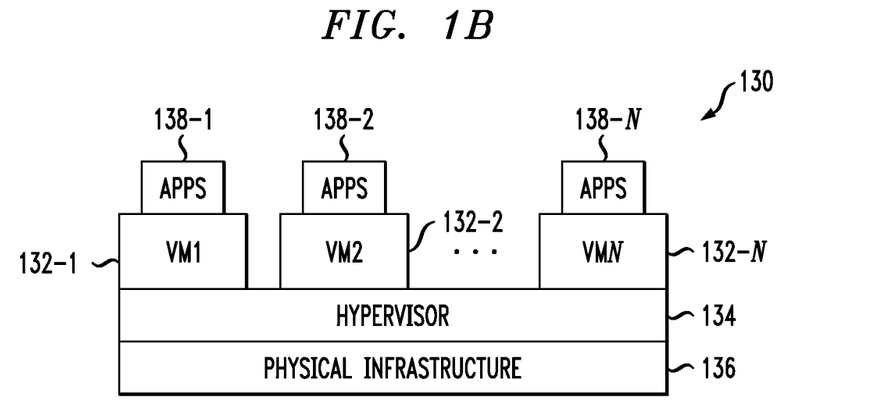
FIG. 1B illustrates a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, . . . 132-N implemented using a hypervisor 134. The hypervisor 134, as mentioned above, is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, . . . 138-N running on respective ones of the virtual machines 132-1, 132-2, . . . 132-N (utilizing associated LUs) under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

An example of a commercially available hypervisor platform that may be used to implement portions of the cloud infrastructure 130 (110) in one or more embodiments of the invention is the VMware® vSphere™ which may have an associated virtual infrastructure management system such as the VMware® vCenter™. The underlying physical infrastructure 136 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 130 (110).

Figure 2:
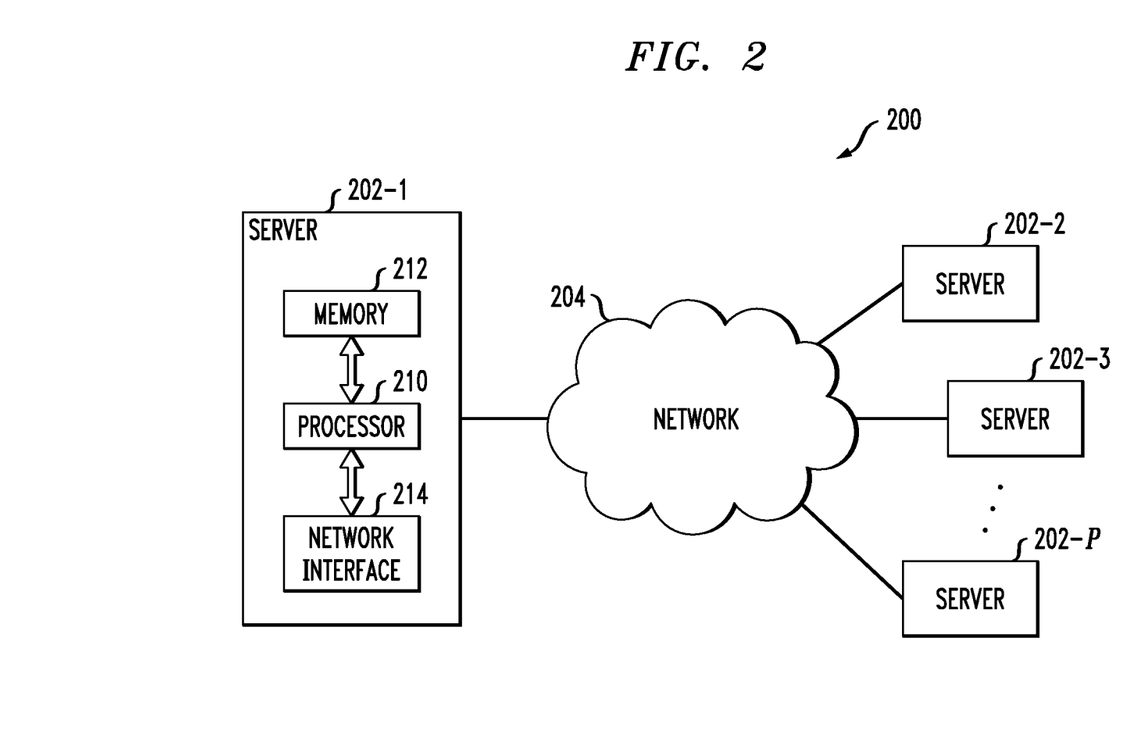
FIG. 2 illustrates a processing platform on which the cloud infrastructure and the content-centric networking-based virtual machine provisioning system of FIG. 1A are implemented, in accordance with one or more embodiments of the invention.

An example of a processing platform on which the cloud infrastructure 110 and/or the content-centric networking-based virtual machine provisioning system 120 of FIG. 1A may be implemented is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 100 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Illustrative details of the content-centric networking-based virtual machine provisioning system 120 will now be described with reference to FIGS. 3 through 8.

As is known, a virtual machine provisioned by a virtualized data center is typically referred to as a VM instance or simply a VM. A VM or VM instance may also be referred to as a VM image file or simply VM image. VM instances are created from a VM template. A VM template contains a basic operating system and one or more applications (e.g., commonly used applications such as a database management system, or some user-specified application) which the VM will run once deployed. The VM template is a static object in that it is not executed. Rather, a VM image or VM instance is created from the VM template, and the VM instance is dynamic in that it is executed and thereby runs an operating system and applications/processes, performing computations and input/output operations. The data center service provider thus provisions VMs to meet the needs of those entities (e.g., customers or tenants) that contract with the service provider to provide processing and/or storage services. However, as mentioned above, provisioning hundreds of thousands of these VMs in a relatively short period of time is a daunting task given the file size of many of the VM images files (gigabytes).

To address these and other issues, embodiments of the invention implement VM provisioning in accordance with a content producer/consumer model, i.e., via a content-centric network (CCN). In CCN, content objects are addressable via content names rather than via the location where the content is stored. Further, in CCN, data is stored, transferred, and cached at a chunk level. It is realized here that a CCN networking approach is an advantageous way to implement a VM provisioning system. For example, as applied to VM provisioning in accordance with embodiments of the invention, a chunk is a content portion or segment of a VM image. One advantage to operating on a chunk level, as opposed to operating on a VM image level, is that chunks that are common across multiple VM images can be more efficiently handled. For example, the CCN approach allows for deduplication of the same chunks among similar VM images. Further, by utilizing an approach whereby a data address is based on content rather than location, management of data in a virtualized data center is vastly improved.

In an illustrative embodiment, a CCN approach based on CCNx™ is employed. CCNx™ is a CCN communications architecture launched and sponsored by Palo Alto Research Center, Inc. (PARC) of Palo Alto, Calif. The CCNx communications architecture is described in a series of protocols and specifications available at ccnx.org-including, but not limited to, those entitled: "CCNx Protocol," "CCNx Repository Protocols," "CCNx Interest Message," and "CCNx Signature Generation and Verification," the disclosures of which are incorporated by reference herein in their entireties. It is to be understood, however, that alternative embodiments may employ other CCN approaches, or combinations thereof, and thus embodiments of the invention are not limited to the CCNx™ communications architecture, nor the CCNx protocols or specifications.

Figure 3:
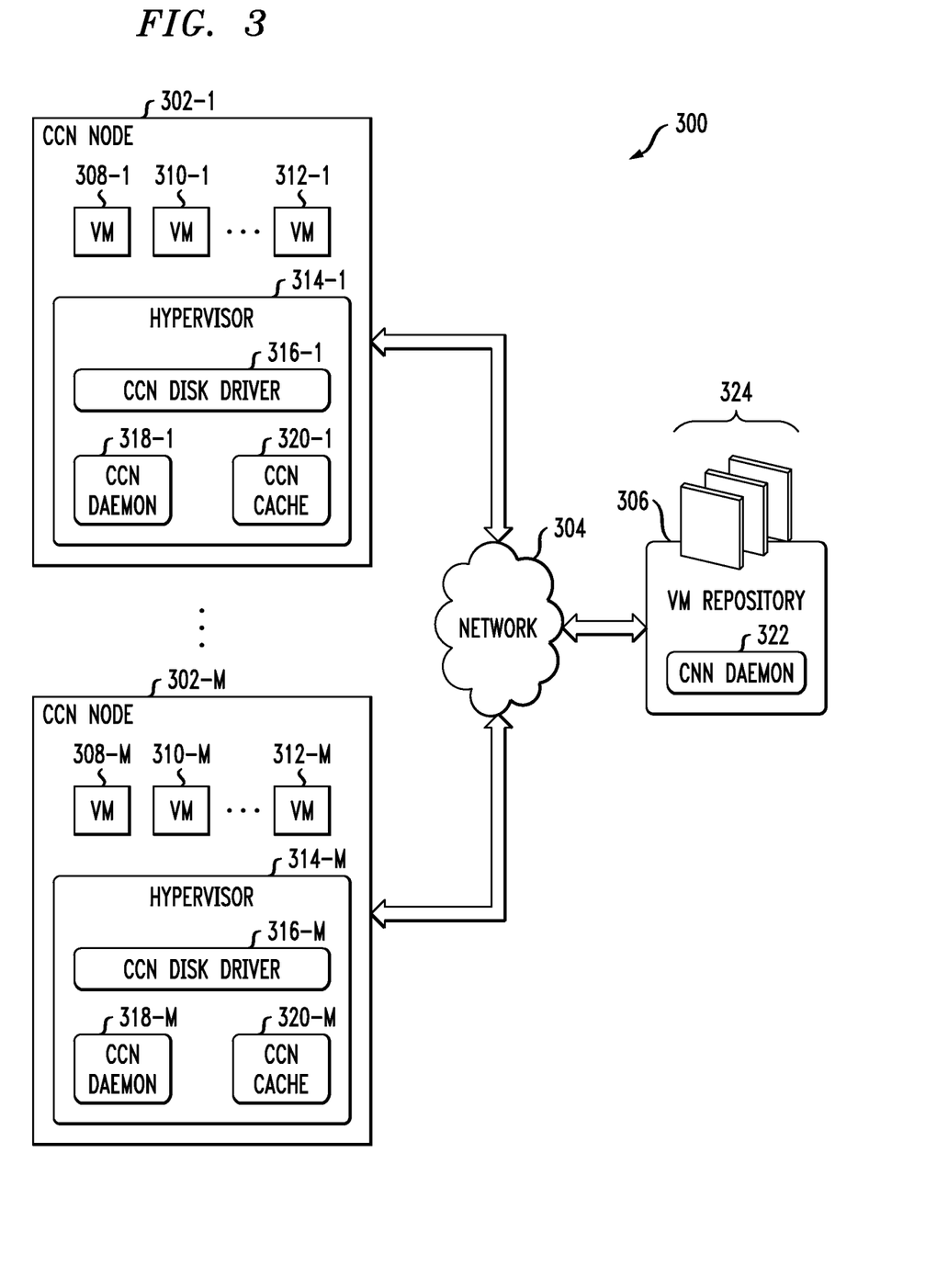
FIG. 3 illustrates a content-centric networking-based virtual machine provisioning system environment, in accordance with one embodiment of the invention.

FIG. 3 illustrates a content-centric networking-based virtual machine provisioning system environment, in accordance with one embodiment of the invention. FIG. 3 is one illustrative embodiment of system 120 described above in the context of FIG. 1.

As shown, the provisioning system 300 includes a plurality of nodes 302-1 through 302-M. Each node is considered a content-centric network (CCN) node. The CCN nodes 302-1 through 302-M are operatively coupled, via a communication network 304, to a VM repository 306. Each CCN node 302 includes the following components (referenced as -1 for CCN node 302-1 and -M for CCN node 302-M): a plurality of VMs 308, 310 and 312 (while three are shown, each node may have more or less VMs deployed thereon); a hypervisor 314; a CCN disk driver 316; a CCN daemon 318; and a CCN cache 320. VM repository 306 includes a CCN daemon 322 and a plurality of VM templates 324. Because VM repository 306 includes a CCN daemon, it too can be considered a CCN node, but for the sake of clarity will be referred to as a VM repository in this illustrative description.

Also note that each CCN node and repository can be implemented via one of the servers 202 described above in the context of FIG. 2. However, in some embodiments, two or more of the CCN nodes and repository may be implemented on the same server 202. Still further, it is to be appreciated that each CCN node and repository can be implemented as part of the computing resources associated with cloud infrastructure 110 in FIG. 1.

Each CCN daemon that respectively resides on the CCN nodes 302 and the VM repository 306 is a background process (i.e., daemon) that allows each node and repository to implement a CCN communications protocol (e.g., CCNx™ in one illustrative embodiment). That is, CCN messages exchanged by the nodes and the repository are sent, received, and otherwise controlled by the CCN daemons running thereon.

The CCN disk driver 316 on each CCN node 302 serves to abstract the underlying CCN network (managed by the daemon 318) and, inter alia, presents a list of content segments as a virtual disk. As will be explained in further detail below, the virtual disk operates in coordination with the VM repository 306 to read and write content objects associated with deployed VMs (308, 310 and 312) at each node that utilize the virtual disk.

The CCN cache 320 on each CCN node 302 serves as local storage for content objects associated with the deployment of the VMs (308, 310 and 312) at each node.

The hypervisor 314 of each node 302 manages the disk driver 316, the daemon 318, and the cache 320, in addition to managing the VMs (308, 310 and 312).

Communication network 304 can be any form of communication network such as the Internet, an intranet, a wireless network, a wired network, or some combination thereof. Accordingly, each CCN node 302 and repository 306 sends and receives (including forwarding and buffering) CCN messages (including requests and content objects) over the communication network 304. As such, all components in FIG. 3 support the CCN communications protocol.

The VM repository 306 plays the role of content provider, and all interactions with the repository are conducted through daemon 322. The data or content associated with a VM template (and thereby a VM or virtual disk deployed from the template) in VM repository 306 is located via a CCN uniform resource identifier (URI), and is split into segments or chunks. A segment is the basic unit for storing, buffering and transmission in system 300. VM templates are stored in VM repository 306 and published via a publisher-specific URI, e.g. ccnx://mycorp.com/app1/linuxvm. All segments for this VM template can be located under this URI prefix (see CCNx Interest Message, cited above, for requesting data segments). It is to be understood that while one VM repository is shown in FIG. 3, system 300 can have several different CCN repositories.

As mentioned above, it is to be understood that one or more VM images are formed from a VM template. In one example, the VM image contains one or more virtual disks which can be loaded by the hypervisor and finally become the whole or part of a particular VM instance. The VM template contains several data structures, contents or pre-defines some formats. The template is then converted or transferred into one or more actual VM images. Generally, a VM template cannot be directly executed (i.e., they are static, while VMs are dynamic).

In one embodiment, to abstract the underlying CCN network and present a list of content segments as part of a given virtual disk, the CCN disk driver 316 is implemented for the VM hypervisor 314. There is a profile for each virtual disk, which contains metadata, including disk size, and a mapping from disk sectors to CCN content objects stored on the VM repository 306. The disk driver 316 manages each such profile. In general, in accordance with the CCNx protocol, the specification (e.g., naming rules, data formats and message semantics) of an application protocol on top of the CCNx protocol is called a "profile." Such a profile may also include specification of one or more application programming interfaces (APIs).

Figure 4:
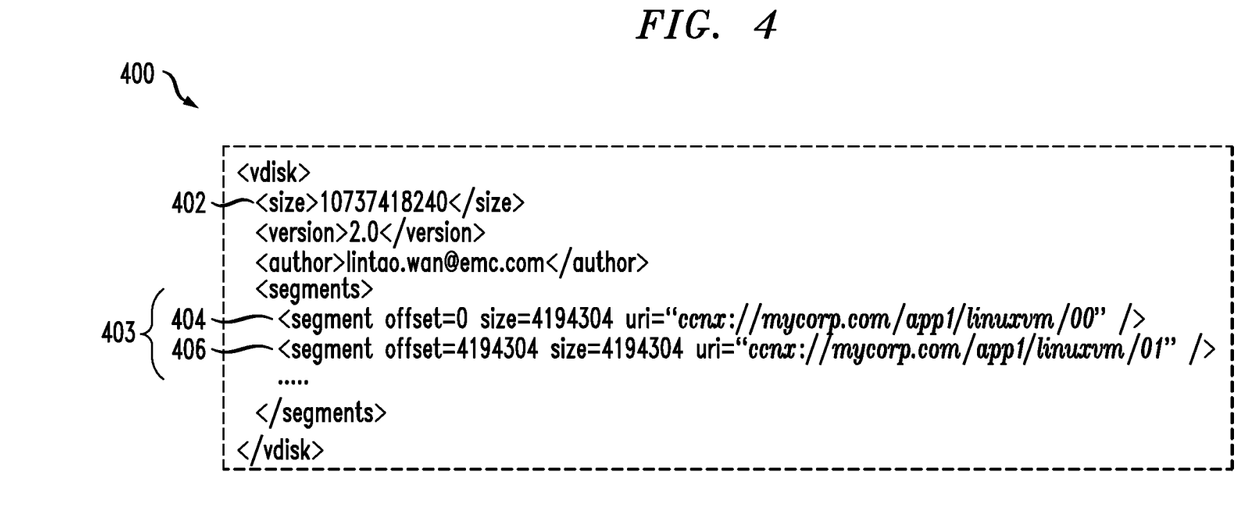
FIG. 4 illustrates a virtual disk profile for use in a content-centric networking-based virtual machine provisioning system, in accordance with one embodiment of the invention.

FIG. 4 is an example profile for a virtual disk represented in XML format. In the example shown in FIG. 4, a profile 400 specifies a virtual disk formed in a data center from one or more VMs. As shown, the profile 400 specifies the size of this particular virtual disk (line 402), as well as a mapping 403 between disk sectors to CCN content objects stored on the VM repository 306 (lines 404 and 406). That is, for example, line 404 specifies that a first content segment is assigned to a first sector of the given virtual disk, and is accessible on the VM repository 306 via the URI specified in line 404. Line 406 then specifies the next disk sector and the URI for the corresponding content object(s) on the VM repository 306.

Given the illustrative CCN network shown in FIG. 3 and virtual disk profile in FIG. 4, several methodologies associated with such an implementation will now be described (with continued reference to components shown in FIGS. 3 and 4).

Figure 5:
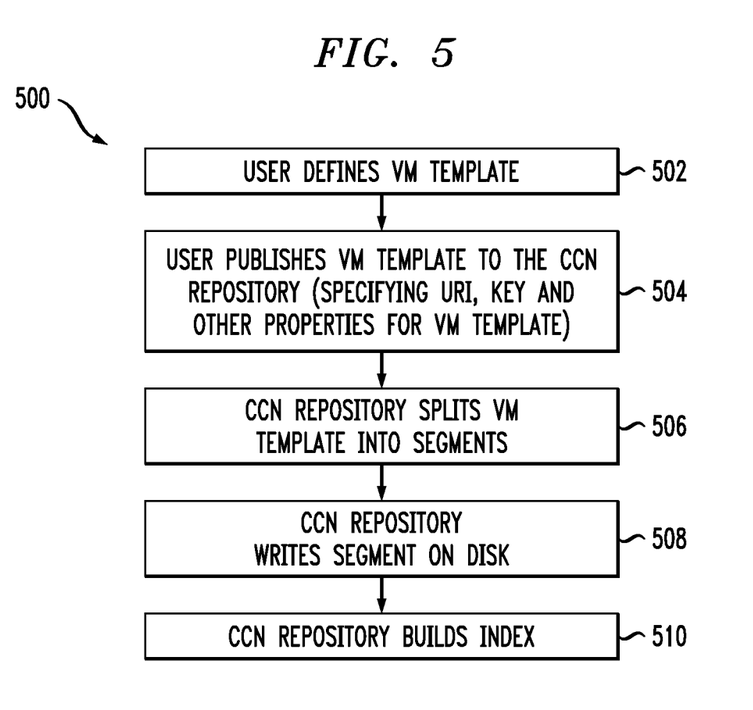
FIG. 5 illustrates a first methodology for use in a content-centric networking-based virtual machine provisioning system, in accordance with one embodiment of the invention.

FIG. 5 illustrates a first methodology for use in a content-centric networking-based virtual machine provisioning system, in accordance with one embodiment of the invention. More particularly, FIG. 5 illustrates a methodology 500 for publishing a VM template (322 in FIG. 3).

As shown, in step 502, a user defines (generates) a VM template. This may be done at one of the CCN nodes 302. The user here may be an administrator of the service provider of the data center, or an administrator of a tenant that is contracting services from the data center service provider. In step 504, the user publishes (imports) the VM template to the VM repository 306. This can be done with a publish tool which supports the CCN protocol. The user specifies the URI, a key and other properties for the VM template. The key is used to generate a digital signature so clients who use this VM template can verify the signature to make sure it is published by a declared user (see the above-cited CCNx specification entitled "Signature Generation and Verification").

In step 506, VM repository 306 splits the VM template into segments. The one or more segments represent one or more content portions of the template (and thus of a VM or virtual disk that is deployed from the template). The one or more content portions are addressable and accessible via the CCN communication protocol. In step 508, the VM repository 306 writes the segments on a given virtual disk, and then builds an index in step 510 for quick location of each segment. Note again that since the communications architecture is content-centric, each segment is addressable via a content name rather than a location address. For example, when the VM template is associated with a virtual disk, the segments or content portions are the disk sectors specified by the disk driver profile (400 in FIG. 4).

Figure 6:
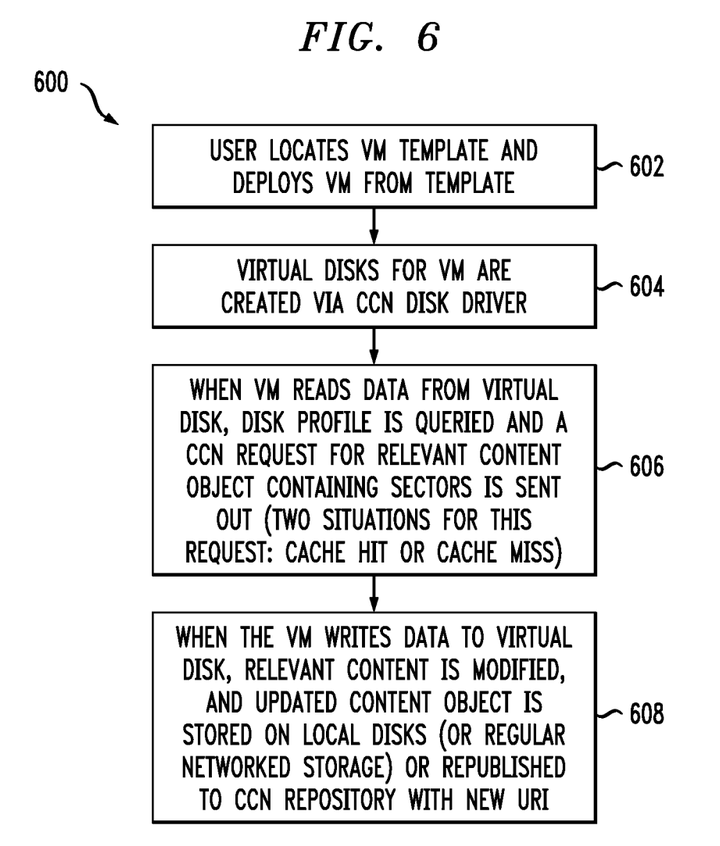
FIG. 6 illustrates a second methodology for use in a content-centric networking-based virtual machine provisioning system, in accordance with one embodiment of the invention.

FIG. 6 illustrates a second methodology for use in a content-centric networking-based virtual machine provisioning system, in accordance with one embodiment of the invention. More particularly, FIG. 6 illustrates a methodology 600 for deploying a VM from the VM template 322.

In step 602, a user locates a VM template 322 on the VM repository 306 and deploys a VM (308, 310 or 312) from the template on a CCN node 302. The virtual disk(s) for the VM is specified (created) via the profile (400) managed by the CCN disk driver 316 in step 604.

In step 606, when the VM reads data from a virtual disk, the disk profile 400 is queried and a CCN request for the relevant content object (stored in one or more disk sectors) is sent out. There are two scenarios for such a request: a cache hit; or a cache miss. For the cache hit scenario, if a given content object has already been cached locally in the cache 320 of the requesting node 302, then the data is returned back immediately. However, if the content object is not cached locally (i.e., a cache miss), then the request is sent to the VM repository 306. There is a possibility that the content object is cached on another nearby node and, if so, it can be fetched therefrom. When the content object is retrieved successfully, it is returned by the disk driver 316 to the VM (308, 310 or 312) and also stored in the local cache 320.

In step 608, when the VM writes data to a virtual disk, the relevant content object will be modified. An updated content object can be handled in several ways. In one embodiment, the modified content object is stored on local disks or a regular networked storage. In an alternative embodiment, the modified content object is republished to the VM repository 306 with a new URI. For both approaches, the profile 400 is updated accordingly.

Figure 7:
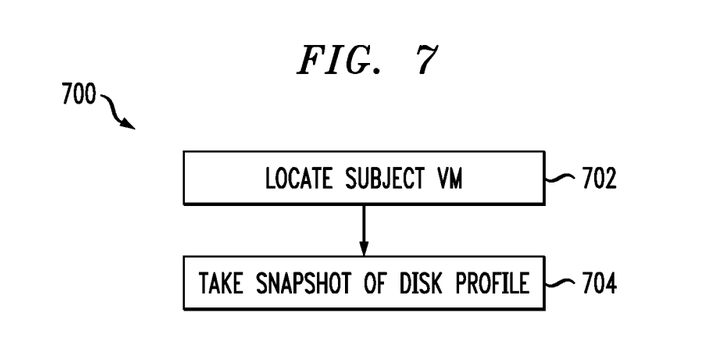
FIG. 7 illustrates a third methodology for use in a content-centric networking-based virtual machine provisioning system, in accordance with one embodiment of the invention.

FIG. 7 illustrates a third methodology for use in a content-centric networking-based virtual machine provisioning system, in accordance with one embodiment of the invention. More particularly, FIG. 7 illustrates a methodology 700 for creating a snapshot of a VM. As is known, a snapshot is a representation of the state of a virtual machine at a given time. The state may include the state of the operating system, applications and/or data associated with the VM.

In step 702, the given VM for which a snapshot is desired is located in the CCN network 300. Then, in step 704, a snapshot is taken of the virtual disk profile (400). This is considered a quick snapshot as it is intended to be a quickly attainable representation of the state of the virtual disk associated with a VM at a given time.

Figure 8:
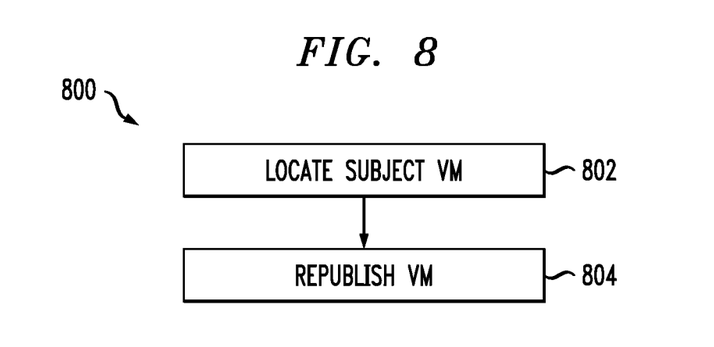
FIG. 8 illustrates a fourth methodology for use in a content-centric networking-based virtual machine provisioning system, in accordance with one embodiment of the invention.

FIG. 8 illustrates a fourth methodology for use in a content-centric networking-based virtual machine provisioning system, in accordance with one embodiment of the invention. More particularly, FIG. 8 illustrates a methodology 800 for republishing a VM.

In step 802, the given VM to be republished is located in the CCN network 300. In step 804, the VM is republished. That is, for the VM, the system can republish a VM, including all the content objects listed in the disk profile, into the VM repository 306. In one example, the system can choose a new URI and publish the given VM as a new VM template. Alternatively, the given VM can be designated as a newer version of the original VM template.

As illustratively explained above, a CCN-based VM provisioning system according to embodiments of the invention provides: a central management for all VM templates; version control for VM templates; different publishers of different URIs; a single VM template used for multiple VM instances; and quick snapshot capability.

Embodiments of the invention provide many advantages. For example, the local cache (320) reduces network workload and latency, and improves input/output performance. The CCN approach is independent of the underlying network infrastructure, and VM templates are located via URIs, instead of hostname/IP address, or LUN (logical unit number). Further, a single VM template can support hundreds of VM instances simultaneously without performance loss, which is also a form of deduplication and, as such, increases storage efficiency. The CCN approach is easy to implement, thus making VM deployment more efficient and easier for the data center service provider.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:

obtaining a virtual machine template stored on a repository, wherein the virtual machine template defines one or more segments which correspond to one or more content portions of the virtual machine template, the one or more content portions being addressable in accordance with a content-centric network communications protocol;

splitting the virtual machine template into the one or more segments corresponding to the one or more content portions;

building an index for locating each of the one or more content portions; and deploying at least one virtual machine from the virtual machine template on a node, wherein deployment of the at least one virtual machine comprises creating one or more virtual disks for the at least one virtual machine, each of the one or more virtual disks comprises a list of at least a portion of the one or more indexed content portion, and specifying a correspondence between sectors of the one or more virtual disks associated with the at least one virtual machine and identifiers used to address the one or more content portions;

wherein the obtaining, splitting, building and deploying steps are performed on one or more physical processing elements associated with a computing system implemented via a distributed virtual infrastructure that communicates via the content-centric network communications protocol.

2. The method of claim 1, wherein the repository and the node communicates via the content-centric communications protocol.

3. The method of claim 2, wherein the node and the repository each comprise a daemon for managing communication via the content-centric communications protocol.

4. The method of claim 2, wherein the node comprises a virtual disk driver for managing the one or more virtual disks associated with the at least one virtual machine.

5. The method of claim 4, wherein the virtual disk driver maintains a virtual disk profile for each of the one or more virtual disks that specifies the correspondence between the sectors of the one or more virtual disks and the identifiers used to address the one or more content portions.

6. The method of claim 5, further comprising the step of capturing a snapshot of the virtual disk profile as a representation of a state of the at least one virtual machine.

7. The method of claim 4, wherein the node comprises a cache for storing one or more content portions.

8. The method of claim 7, further comprising:

obtaining a request to read at least one content portion from the virtual disk driver of the node;

checking the cache to determine whether the requested content portion is stored on the cache;

returning the requested content portion when the requested content portion is found on the cache; and sending the request to the repository when the requested content portion is not found on the cache.

9. The method of claim 7, further comprising:

obtaining a request to write to at least one content portion associated with the virtual disk driver of the node;

modifying the requested content portion based on the write request; and storing the modified content portion in the cache of the node or in the repository.

10. The method of claim 9, further comprising assigning a new uniform resource identifier to the modified content portion.

11. The method of claim 9, further comprising utilizing the identifier of the requested content portion as the identifier of the modified content portion.

12. The method of claim 2, wherein the node comprises a hypervisor for managing the at least one virtual machine and the one or more virtual disks associated therewith.

13. The method of claim 2, further comprising deploying multiple virtual machines on one or more nodes from the virtual machine template stored on the repository.

14. The method of claim 2, wherein the virtual machine template, prior to being used to deploy a virtual machine, is imported to the repository and split into the one or more segments corresponding to the one or more content portions by the repository.

15. A computer program product comprising a non-transitory processor-readable storage medium having encoded therein executable code of one or more software programs, wherein the one or more software programs when executed by the one or more physical processing elements of a computing system, implemented via a distributed virtual infrastructure that communicates via a content-centric network communications protocol, causes the computing system to:
  obtain a virtual machine template stored on a repository, wherein the virtual machine template defines one or more segments which correspond to one or more content portions of the virtual machine template, the one or more content portions being addressable in accordance with a content-centric network communications protocol;
  split the virtual machine template into the one or more segments corresponding to the one or more content portions;
  build an index for locating each of the one or more content portions; and
  deploy at least one virtual machine from the virtual machine template on a node, wherein deployment of the at least one virtual machine comprises creating one or more virtual disks for the at least one virtual machine, each of the one or more virtual disks comprises a list of at least a portion of the one or more indexed content portions, and specifying a correspondence between sectors of the one or more virtual disks associated with the at least one virtual machine and identifiers used to address the one or more content portions.

16. A content-centric network comprising:
  a repository; the repository storing one or more virtual machine templates, splitting each of the one or more virtual machine templates into one or more segments corresponding to one or more content portions, wherein each virtual machine template defines the one or more segments corresponding to the one or more content portions of the virtual machine template, and building an index for location of each of the one or more content portions; and
  one or more nodes operatively coupled to the repository, wherein each node is configured to deploy one or more virtual machines from at least one of the one or more virtual templates stored at the repository, wherein deployment of the at least one virtual machine comprises creating one or more virtual disks for the at least one virtual machine, each of the one or more virtual disks comprises a list of at least a portion of the one or more indexed content portions, the one or more nodes communicating with the repository in accordance with a content-centric network communications protocol, and specifying a correspondence between sectors of the one or more virtual disks associated with the at least one virtual machine and identifiers used to address the one or more content portions;
  wherein the repository and the one or more nodes are implemented on one or more processing devices coupled to a memory, and the one or more nodes and the repository are implemented via a distributed infrastructure that communicates via the content-centric network communications protocol.

17. The network of claim 16, wherein the one or more nodes and the repository each comprise a daemon for managing communication via the content-centric communications protocol.

18. The network of claim 16, wherein each of the one or more nodes comprises a virtual disk driver for managing the one or more virtual disks associated with the one or more virtual machines which the node deploys.

19. The network of claim 16, wherein each of the one or more nodes comprises a cache for storing one or more content portions.

* * * * *